(12) United States Patent
Berishev et al.

(10) Patent No.: US 9,110,246 B2
(45) Date of Patent: Aug. 18, 2015

(54) HIGH POWER SPATIAL FILTER

(71) Applicants: Igor Berishev, Holden, MA (US);
Vadim Chuyanov, Oxford, MA (US);
Alexey Komissarov, Charlton, MA (US); Nikolai Strougov, Oxford, MA (US)

(72) Inventors: Igor Berishev, Holden, MA (US);
Vadim Chuyanov, Oxford, MA (US);
Alexey Komissarov, Charlton, MA (US); Nikolai Strougov, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 171 days.

(21) Appl. No.: 13/904,130

(22) Filed: May 29, 2013

(65) Prior Publication Data

US 2014/0355638 A1    Dec. 4, 2014

(51) Int. Cl.
| | |
|---|---|
| *G02B 6/32* | (2006.01) |
| *G02B 6/42* | (2006.01) |
| *G02B 6/14* | (2006.01) |
| *G02B 6/26* | (2006.01) |
| *H01S 3/094* | (2006.01) |
| *H01S 3/0941* | (2006.01) |

(52) U.S. Cl.
CPC .............. *G02B 6/32* (2013.01); *G02B 6/4296* (2013.01); *G02B 6/14* (2013.01); *G02B 6/262* (2013.01); *H01S 3/09415* (2013.01); *H01S 3/094003* (2013.01); *H01S 3/094053* (2013.01)

(58) Field of Classification Search
CPC ......... G02B 6/262; G02B 6/32; H01S 3/0941

USPC ................................................ 385/33; 372/75
See application file for complete search history.

(56) References Cited

U.S. PATENT DOCUMENTS

| | | | | |
|---|---|---|---|---|
| 5,631,991 | A * | 5/1997 | Cohen et al. ..................... | 385/93 |
| 5,751,869 | A | 5/1998 | Li et al. | |
| 6,504,975 | B1 * | 1/2003 | Yamagata et al. .............. | 385/33 |
| 6,625,351 | B2 * | 9/2003 | Cox et al. ......................... | 385/33 |
| 6,674,941 | B2 * | 1/2004 | Tatum et al. ..................... | 385/33 |
| 6,751,379 | B2 * | 6/2004 | Capewell et al. ............... | 385/36 |
| 6,776,537 | B2 * | 8/2004 | Toyama .......................... | 385/93 |
| 6,979,134 | B2 * | 12/2005 | Ishii et al. ....................... | 385/88 |
| 7,075,117 | B2 * | 7/2006 | Yamada .......................... | 257/98 |
| 7,540,668 | B2 * | 6/2009 | Brown ............................. | 385/78 |
| 8,733,995 | B2 * | 5/2014 | Sato et al. ..................... | 362/551 |
| 2004/0146250 | A1 * | 7/2004 | Wakabayashi et al. ......... | 385/79 |
| 2006/0244956 | A1 | 11/2006 | Furman et al. | |
| 2010/0027943 | A1 * | 2/2010 | Armani et al. .................. | 385/74 |
| 2010/0303419 | A1 | 12/2010 | Benjamin | |
| 2011/0286698 | A1 * | 11/2011 | Greenberg et al. ............. | 385/33 |

OTHER PUBLICATIONS

International Search Report, dated Aug. 28, 2013.

* cited by examiner

*Primary Examiner* — Daniel Petkovsek
(74) *Attorney, Agent, or Firm* — Yuri Kateshov, Esq.; Timothy J. King

(57) ABSTRACT

An improved high power spatial filter, system and method. In the system, an optical fiber is disposed inside a ferrule channel structure, and the channel structure is aligned with a focusing lens system. The end of the fiber is at a distance D from the channel opening that faces the focusing lens system, and D is determined by the system's numeric aperture factor and the cladding thickness of the optical fiber.

13 Claims, 4 Drawing Sheets

HIGH POWER SPATIAL FILTER

BACKGROUND OF THE INVENTION

1. Field of the Invention

The present invention relates to optical systems operative to filter out high numerical aperture ("NA") rays from laser light propagating through free space.

2. Description of the Related Art

To meet current industrial requirements, lasers in general including solid and fiber lasers become more and more powerful. High light powers however often should be attained without degrading the quality of laser light. Propagation of laser light through free space in various configurations of fiber laser systems is customary. For example, pigtailed optical components of fiber laser systems, such as isolators, circulators and the like, are configured with light path stretches requiring light to propagate via free space. Still another optical configuration requiring light propagation via free space includes laser diode modules typically operating as pumps sources. A laser diode module typically has a plurality of laser diodes which emit respective beams. The beams are further collimated and focused on the entry faucet of a multimode ("MM") delivery fiber which further guides pump light to fiber gain blocks.

The coupling of the focused light into an optical fiber is of importance in general and, in particular, when a laser diode module functions as pump for fiber laser systems capable of emitting laser light. The progress observed in various industries, as a rule, requires increasingly high laser beam powers with a high quality of the laser beam.

Meeting this requirement is so-called high power fiber laser systems typically including one or multiple diode pump modules. The generated pump light is then coupled into one or multiple gain blocks. A gain block is configured with an active fiber typically having a multimode ("MM") core which is structured to support substantially only a fundamental mode ("FM") at the desired wavelength. Input and output single mode ("SM") passive fibers, coupled to respective opposite ends of the active fiber, typically complete a fiber unit of gain block.

A pump laser diode module for a high power laser system is configured as a pigtailed optical element, i.e., the element with an optical fiber coupled thereto. Accordingly, focused MM light from a plurality of emitters is coupled into a MM passive fiber which, true to its definition, supports multiple transverse modes including the most powerful, fundamental mode. The modes "compete" for a given power. With a higher number of HOMs excited in the MM passive fiber, the power of the fundamental mode lowers.

The power loss of the delivered fundamental mode greatly affects the overall efficiency of the high power fiber laser system disclosed above. Accordingly, it is desirable that the fundamental mode delivered by the MM passive fiber be maximally powerful which can be achieved by reducing the number of HOMs.

There are several factors influencing the number of excited HOMs. For example, during the coupling process of the focused light into MM passive fiber, most of the light enters into the MM core. Such light predominantly excites central core modes with the intensity of the light power aligned around the core region of the optical fiber which is mainly occupied by a fundamental mode and a few central HOMs.

But some laser light rays with respective large numerical apertures, i.e., rays that propagate at relatively great angles with respect to the optical axis of the fiber, stray away from and are not well aligned with the MM core. Such stray rays may excite a great deal of peripheral core HOM typically propagating along the core/cladding interface and cladding modes of the fiber. These peripheral HOMs also reduce the power and quality of the fundamental mode and, in addition, quite often tend to couple out of the fiber presenting environmental hazard. In particular, a protective polymeric layer shielding a fiber from mechanical stresses, may be easily damage which often leads to irreparable damages to the fiber itself. In addition, decoupled light is hazardous to other optical components of a fiber system.

Conventionally an aperture stop or a diaphragm is used to filter away the strayed laser rays from entering into the fiber. This straightforward solution generally works well for regular free space optics. However, in micro-optics associated with high power pump modules, the aperture stop is more difficult to handle. Therefore, the requirement for high precision in mounting and alignment with respect to the optical fiber axis cannot always be satisfied. The latter, in turn, decreases reliability and reproducibility of laser modules for high volume production.

The excitement of peripheral modes causing the above-discussed undesirable consequences is not exclusively limited to a pump light delivery system. Fiber laser systems often have stretches of light path along which collimated light propagates through free space and then is coupled into a fiber. For example, a termination block has collimating lenses or multi-cascaded high power fiber laser system often includes isolators, circulators and other bulk components configured with free space path stretches before the light is to be coupled into a fiber. In many instances, the coupling of light propagating through into a fiber may have the same problems as disclosed above in regard to a pump light delivery system.

A need, therefore, exists for an improved method of minimizing excitation of peripheral and cladding HOMS in a passive MM fiber receiving MM light travelling via free space.

A further need exists for an optical system implementing the improved method.

ASPECTS AND SUMMARY OF THE INVENTION

The disclosed optical system satisfies the above-identified needs. In particular, the system is configured with a light source emitting light which further propagates via free space and incident on a focusing optical component. The focused light is further incident on a fiber, which is aligned with the component, and includes small and high NA rays extending at respective angles relative to the component's optical axis.

Disclosed hereinbelow is an improved method for reducing the excitation of the higher high and cladding modes by filtering high numerical aperture stray light rays from light incident on the fiber.

This is realized by disposing the optical fiber tip inside a ferule channel with the fiber's upstream facet spaced inwards at distance from the opening edge of the channel. The end of the ferule impinged by converging high NA light rays is coated with a layer of high reflective coating material, for example, a dielectric or a metal material which reflects high NA rays incident thereon and thus prevents their coupling into the fiber's core.

The distance of the fiber facet for light coupling into the fiber to the opening end of the fertile channel at the light coupling intersection is now understood as determined with the following formula: $D=t/\tan(\arcsin(NA/n))$. In the latter, D is the depth the fiber facet into the ferule channel from the opening edge, t is the thickness of the cladding region of the optical fiber, NA is the desired numerical aperture, and n is the reflective index of the medium through which the light travels to the entrance fiber facet.

With this simple design improvement, the need of mounting and aligning an aperture stop is eliminated, which not only increases the reliability of the laser diode pump system, but also reduces the overall cost of manufacturing of the laser diode pump system.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
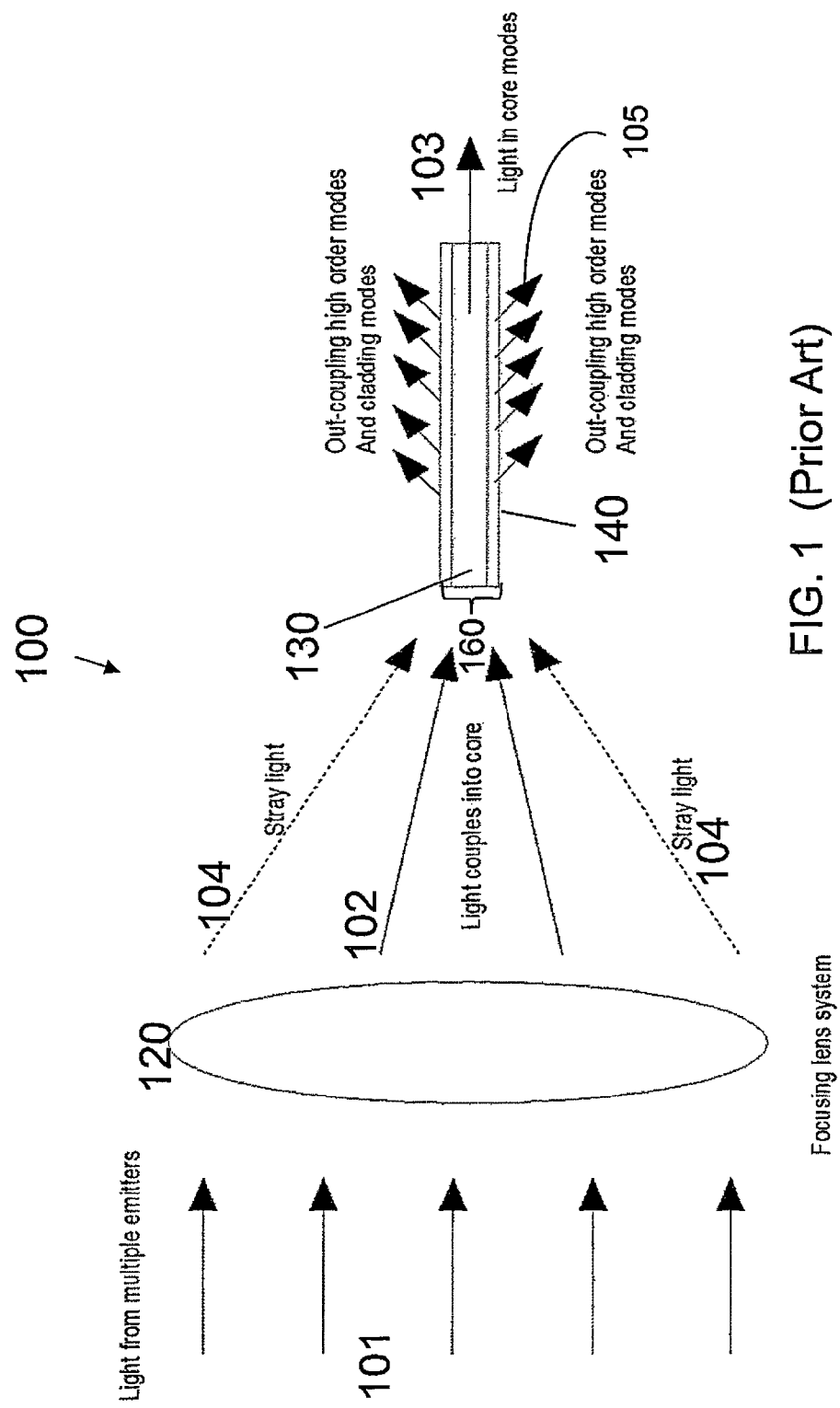
FIG. 1 diagraphically shows a general laser light coupling process in a high power laser diode pump module in fiber optics.

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. These and similar directional terms should not be construed to limit the scope of the invention in any manner.

An optical fiber is a flexible, transparent fiber made of a glass silica not much wider than a human hair. Optical fibers typically include a transparent core surrounded by a transparent cladding material with a lower index of refraction. Light is kept in the core by total internal reflection. Fibers whose cores support many propagation transverse paths are called multi-mode ("MM") fibers while those that only support a single mode are called single mode ("SM") fibers. SM fibers emit a high quality but relatively low power light beam having a small spot size. MM fibers generally have a larger core diameter than SM fibers, and are used for applications where high power must be transmitted but beam quality requirements are somewhat less stringent than those for SM fibers. Accordingly, when both power and quality requirements for a laser beam are high, it is desirable to use MM fibers which support only few HOMs.

The excitation of modes depends on a variety of factors including, among others, a numerical aperture ("NA"). The NA is commonly used in fiber optics to describe the cone of light accepted into the fiber or exiting it in respect to a point, $NA = n \sin \theta$ where n is the index of refraction of the medium in which the lens is working in, θ is the half-angle of the maximum cone of light that can enter or exit the fiber from the point.

In reference to FIG. 1, a general light coupling process 100 involving a light source, for example a laser diode module which functions, for example, as a pump source, is described. Parallel laser beams 101 from multiple emitters are incident on a focusing lens system 120 configured to bend the beams to rays 102 which converge at respective different angles or NAs to the focal point of the lens system. A MM passive fiber 160 is typically mounted in a ferrule so that its upstream end is substantially placed in a Rayleigh region of MM beam shaped by lens system 120. After the focusing process of lens system 120, bent light rays with a relatively small NA 102 are predominantly operatively coupled into the core of optical fiber 160 in fundamental and few high order core modes and propagate out as laser light 103. However, stray light rays 104—rays with higher numerical aperture or greater angle relative to the axis of fiber 160, which typically excite additional high order core modes and cladding modes 105—are blocked from coupling into the fiber. These additional HOM core and cladding modes may outcouple into the protective layer of fiber 160 and heat it to elevated temperatures that may cause its burning and detrimentally affect other system components.

Figure 2:
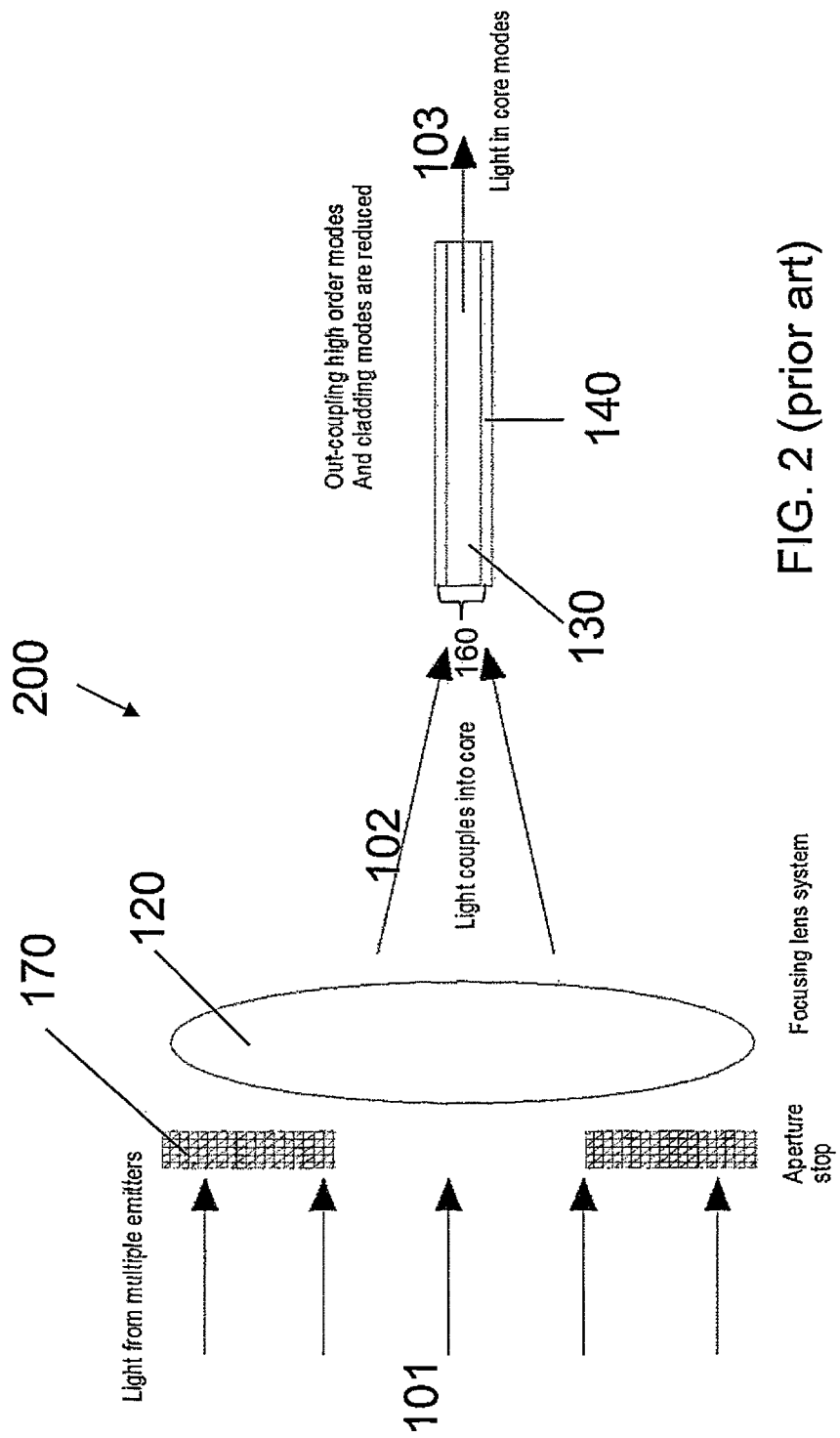
FIG. 2 is a diagraphically sectional view of a conventional mechanism in laser light coupling to reduce stray light rays from entering an optical fiber in laser fiber optics.

In reference to FIG. 2, conventionally an aperture stop 170 is added into the light focusing pathway to block the peripheral beams from respective emitters which then bent at large angles from entering focusing lens system 120, only those beams that are further bent to low NA travel rays 102 are allowed to go through the aperture and be coupled into the fiber 160, reducing the amount of cladding modes light rays and high order modes light rays. This is a "classical" straightforward way which is effective for regular free space optics. When dealing with micro-optics, as in case of focusing optical systems for high power pump modules, this method may be not as straightforward. Very often, due to choices of alignment and mounting methods, the centering of the aperture stop with respect to the optical axis of the system can be difficult and not reproducible in the high volume production environment.

Figure 3:
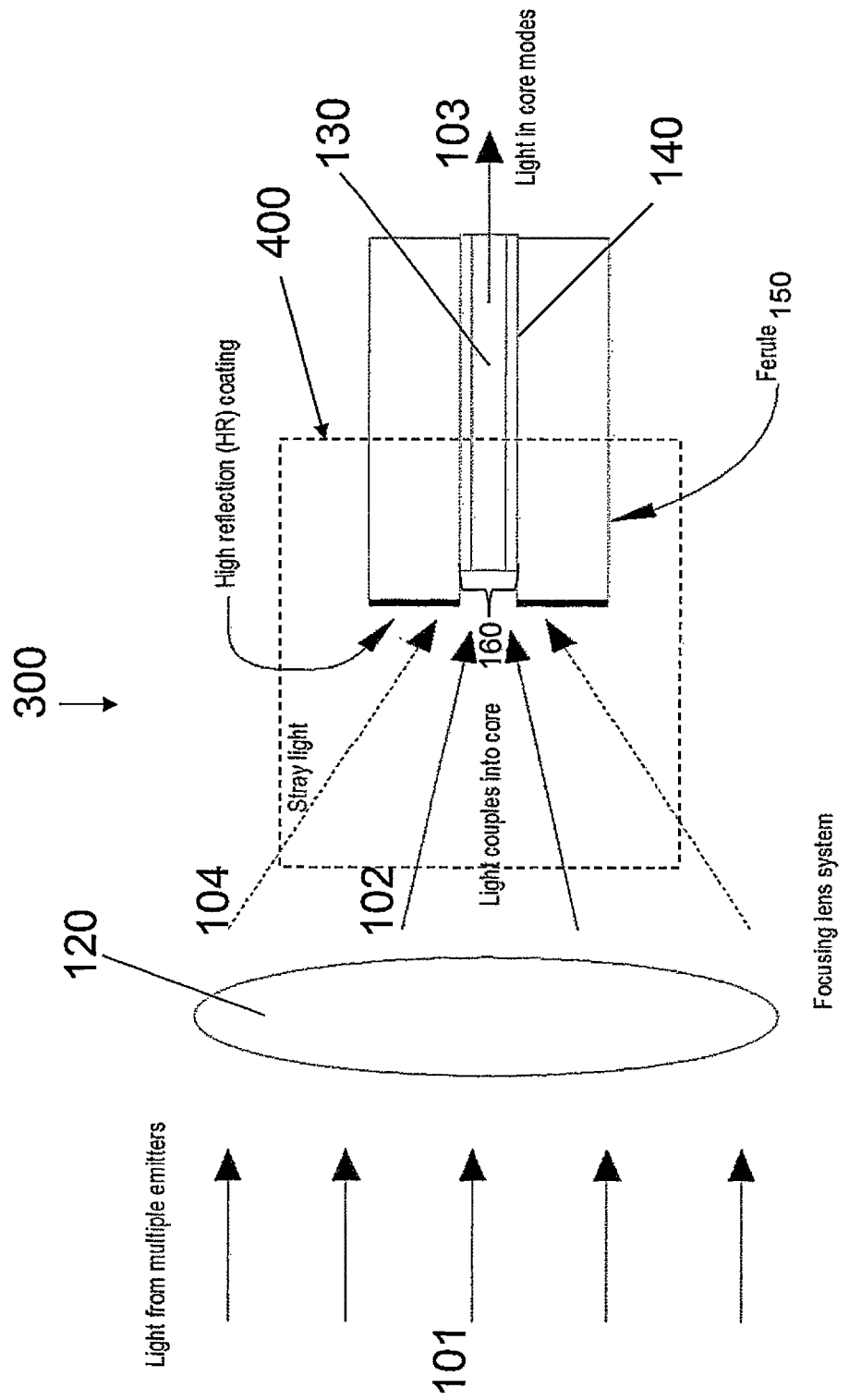
FIG. 3 is a diagraphically sectional view of an improved laser light coupling mechanism for a laser diode pump module in fiber optics in accordance with this application.

In reference to FIG. 3, an improved mechanism 300 for light coupling into a fiber 160 from a high power laser diode pump module is shown in a sectional view. The optical fiber 160 is disposed inside ferule channel 150 with the end of ferule 150 coated with a layer of high reflection material. The aperture stop 170 shown in FIG. 2 is removed, but stray high NA light rays 104 are reflected away from entering into optical fiber 160 by the front end of ferule 150 instead. This improvement eliminates the necessity of aligning the aperture stop with the optical fiber axis; the placement of the optical fiber inside the ferule channel is highly reproducible and can be controlled with high precision.

Figure 4:
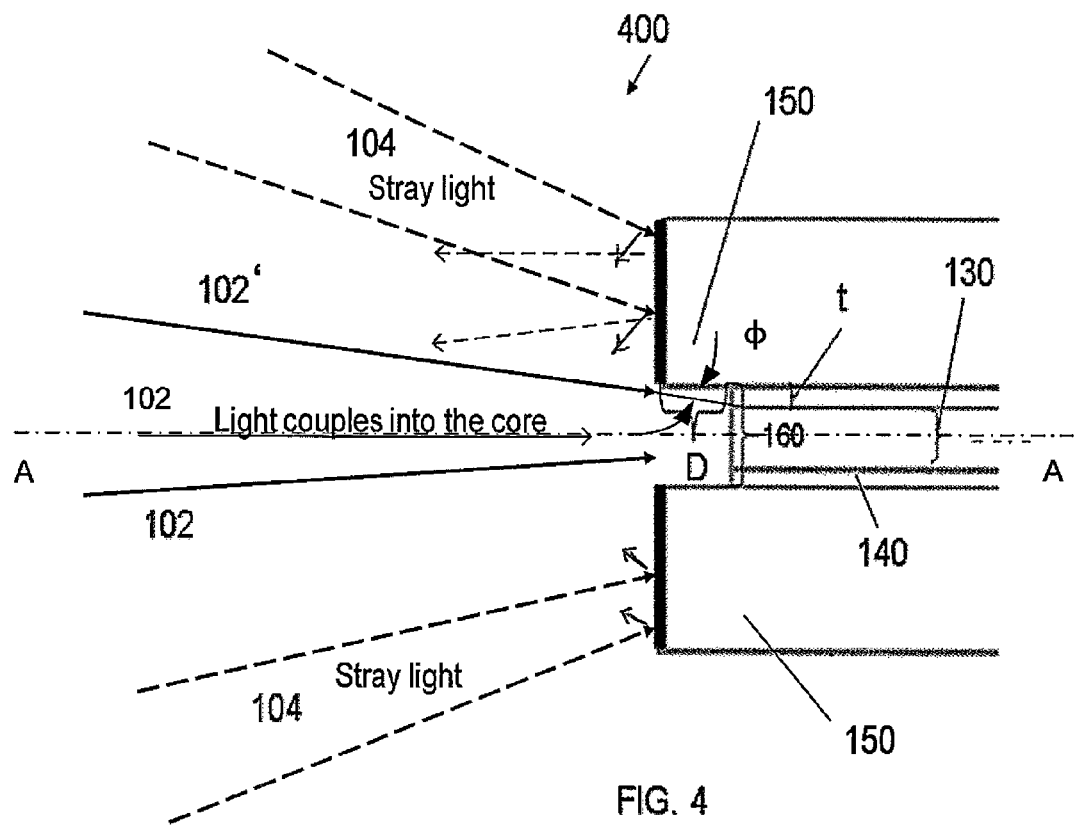
FIG. 4 is an exploded view of the intersection structure of the laser light coupling process in an example improved high power laser diode pump module in accordance with this application.

FIG. 4 is an exploded view of area 400 in FIG. 3. One or more end surfaces of ferule 150 that faces the incoming light is coated with a layer of high reflective material 151, for example, a layer of dielectric material or a layer of metal. The optical fiber 160 is disposed inside the ferule channel 150 with its upstream end lying along a Rayleigh region of the focused beam. A particular a distance "D" at which the upstream end of the fiber is spaced from the upstream edge of ferule channel 150 can be determined for the desired NA based on a ray-optics approach or wave-optics approach.

Referring to the ray optics, distance "D" can be determined as follows: assume that the cladding of fiber 160 has "t" thickness. With stray high NA rays 104 being blocked by the end of ferule channel 150 and reflected away, amount of high NA rays 102' entering into optical fiber 160 has a reverse relationship with the depth "D." With the larger "D", the entrance faucet of the MM passive optical fiber 160 is located further inside the ferule channel reducing, thus, the number of stray light rays that can enter into the cladding and/or cladding-core interface of the optical fiber. For a given target numerical aperture ("NA"), and known thickness t of cladding, the desired distance "D" can be determined as disclosed below.

To prevent generation of HOMs, high NA rays 102' should be prevented from coupling into core 140. Accordingly, knowing a target angle "φ", it is possible to determine distance "D" in accordance with the following:

$$\tan \phi = t/D$$

From the above relations, distance "D" can be determined as $$D = t/\tan \phi$$

The "φ" angle is determined as follows:

$$\phi = \arcsin(NA/n),$$

Wherein n is refractive index of air and therefore equal to 1, NA is a desired target NA.
From the above, it follows that $$D = t/\tan(\arcsin NA)$$

where D is the distance at which the entry faucet of the optical fiber is located from the open edge of the ferule channel, t is the cladding thickness of the optical fiber. Thus, for a certain desired target NA, for example, 0.135, and t=10 μm, the entry faucet of optical fiber needs to be at a distance D=73 μm from the ferule channel opening end. D is easily calculated and can be precisely controlled. This improvement enables a high power laser diode pump module be manufactured with high precision, high reproducibility and automation, but less cost. From the wave-optics standpoint, the required depth can be obtained from the beam waist calculations within the Rayleigh region of the focused beams which bring the same result as discussed above.

Figure 5:
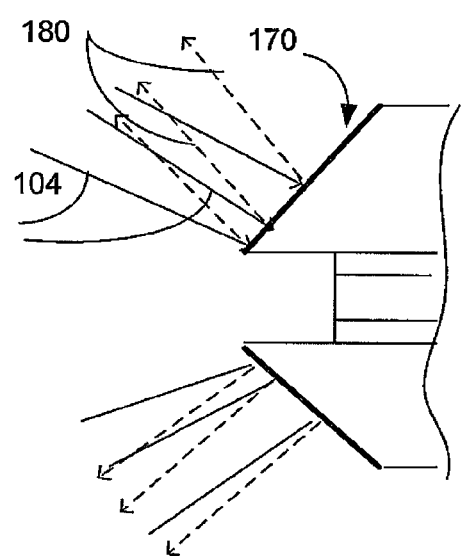
FIG. 5 is a schematic view of one embodiment the laser coupling mechanism of FIGS. 3 and 4.

FIG. 5 illustrates a modification of an end coated surface 170 of ferrule 150. Referring to FIG. 4, the faucet of the ferrule's end surface extends in a plane extending substantially perpendicularly to an axis A-A of the fiber. In this configuration, back-reflected rays are incident on focusing components and may create a thermo-related problem causing elevated temperatures which may be detrimental to these and other upstream components. To avoid such an undesirable back-reflection, coated end surface 170 has a generally conical which reflects high NA rays 104, incident thereon, at such an angle that reflected rays 180 do not impinge upon the upstream components.

The above-disclosed structure is disclosed with a light source configured as a laser diode module emitting high power, bright MM light. However, as readily recognized by one of ordinary skill the laser art, the light source may have a variety of configurations including for example a fiber, collimator and others.

Having described at least one of the preferred embodiments of the present invention with reference to the accompanying drawings, it will be apparent to those skilled in the art that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An optical system comprising:
    a focusing component configured to focus a beam incident thereon so that the focused beam includes a plurality of rays converging towards an axis at an angle range which is characterized by a small numerical aperture (NA) at most equal to a target NA, and another angle range characterized by a high NA at least equal to the target NA;
    an elongated ferrule extending along a longitudinal axis and having an inner surface defining an inner central channel; and
    an optical fiber extending coaxially with and disposed in the central channel with an upstream end of the fiber being spaced inwards from an upstream end of the ferrule at a predetermined distance D to create a void at a terminus of the ferrule, wherein substantially only the small NA rays enter the terminus and are coupled into a core of the fiber.

2. The optical system of claim 1, wherein the upstream end of the ferrule is coated with a layer of reflective material preventing the rays with the high NA from coupling into the ferrule.

3. The optical system of claim 2, wherein the reflective material includes a dielectric material or metallic material or ceramic material or a combination thereof.

4. The optical system of claim 1 further comprising a light source including a high power laser diode module configured with a plurality of light emitters which output respective substantially parallel output beams incident on the focusing component, the focusing component being a focusing lens.

5. An optical system, comprising:
    a focusing component configured to focus a beam incident thereon so that the focused beam includes a plurality of rays converging towards an axis at an angle range which is characterized by a small numerical aperture NA at most equal to a target NA, and another angle range characterized by a high NA at least equal to the target NA;
    an elongated ferrule extending along a longitudinal axis and having an inner central channel; and
    an optical fiber disposed in the central channel with an upstream end of the fiber being spaced inwards from an upstream end of the feaule at a distance D to create a void at a terminus of the ferrule, wherein substantially only the small NA rays enter the terminus and are coupled into a core of the fiber,
wherein the upstream ends of respective ferrule and fiber are spaced from one another at the distance D determined in accordance with a following relationship:
    D=t/tan (arcsin NA),
wherein NA is the target NA, t is a thickness of fiber cladding, and n is a refractive index of ambient air equal to 1.

6. The optical system of claim 5, wherein the upstream end of the fiber lies within a Rayleigh region of the focused beam.

7. A high power laser diode pump module comprising:
    a plurality of emitters outputting respective substantially parallel beams along a light path;
    a focusing lens impinged upon by and configured to converge the parallel beams at an angle range which is characterized by a low numerical aperture (NA) smaller than a reference value, and at another angle range which is characterized by a high NA above the reference value;
    an elongated ferrule extending along a longitudinal axis and having an inner central channel aligned with the focusing lens; and an optical multimode (MM) fiber mounted within the channel with an upstream end thereof being spaced axially downstream from an upstream end of the ferrule, so that the converged beams with the high NA are reflected from the upstream end of the ferrule, while the relatively low NA rays are coupled into a core of the MM fiber.

8. The module of claim 7, wherein the upstream end of the ferrule is coated with a layer of reflective material.

9. The module of claim 8, wherein the reflective material is either a dielectric material or metallic or ceramic material or a combination of these.

10. The module of claim 7, wherein the upstream end of the fiber is located within a Rayleigh range of the converged beam.

11. The module of claim 7, wherein the upstream end of the ferrule lies in a plane extending substantially perpendicular to the axis.

12. The module of claim 7, wherein the upstream end of the ferrule has a generally frustoconical shape expanding away from the focusing lens so as to reflect the high NA rays incident thereon away from the optical component.

13. The high power laser diode pump module, comprising:
a plurality of emitters outputting respective substantially parallel beams along a light path;
a focusing lens impinged upon by and operative to converge the parallel beams at an angle range which is characterized by a low numerical aperture (NA) smaller than a reference value, and at another angle range which is characterized by a high NA above the reference value;
an elongated ferrule extending along a longitudinal axis and having an inner central channel aligned with the focusing lens; and
an optical multimode fiber mounted within the inner channel with an upstream end thereof being spaced axially downstream from an upstream end of the ferrule, so that the converged beams with the high NA are reflected from the upstream end of the ferrule, while the relatively low NA rays are coupled into a core of the fiber,
wherein the upstream ends of respective ferrule and fiber are spaced from one another at a distance D determined as: $D=t/\tan(\arcsin NA)$, wherein the NA is the reference value and t is a thickness of a cladding of the fiber.

\* \* \* \* \*